March 11, 1947.     E. A. BERRY     2,417,150
SINE BAR
Filed April 25, 1945
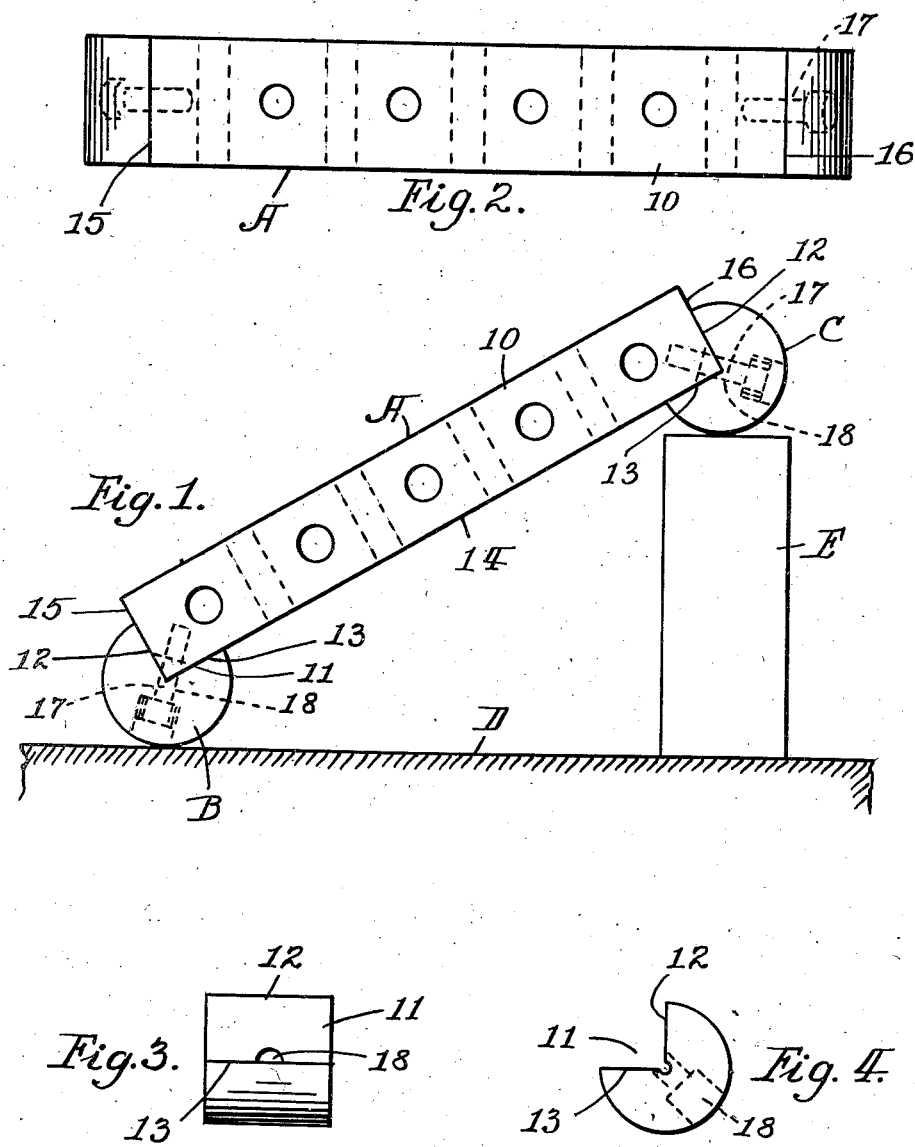
INVENTOR.
Ernest A. Berry,
BY
Attorney.

Patented Mar. 11, 1947

2,417,150

UNITED STATES PATENT OFFICE 2,417,150

SINE BAR

Ernest A. Berry, Inglewood, Calif.

Application April 25, 1945, Serial No. 590,244

2 Claims. (Cl. 33—174)

My invention relates to sine angle bars and more particularly to a bar which is applicable to measuring instruments and various devices which are used in machine shop practice for accurately determining various angles in relation to a plate, bed or other surface. One of its many applications in practice is to a sine angle bar which is used by machinists and others in conjunction with the working surface of a plate or bed of a machine to establish an accurate angle between said surface or bed and a plane fiducial (standard) surface. The improvement is called a sine angle bar because it is applicable to various articles to cooperate therewith in determining the desired angle or ratio at which a work object is held in terms of its natural sine.

It has been common practice to apply sine angle rollers to sine bars and sine plates, which latter respectively comprise a body of irregular shape having a longitudinal plane surface which is the fiducial surface and two cylindrical rollers of equal diameter, whose axes are parallel with each other and with the plane of the fiducial surface. These cylindrical rollers have been set in right dihedral angular notches in the irregular shaped body. Such an arrangement requires a comparatively thick bar or plate to accommodate the notches and high precision and costly workmanship in constructing the body. The rollers have usually been secured to the body by bolts, the heads of which are countersunk in the body. This has also at times been found inconvenient and difficult to apply in practice on account of the increased thickness of the body which is required for accommodating the notches. By my improvement notching the body is avoided and the body consequently may be of reduced thickness and of regular and not irregular shape.

My improved rollers are so constructed as to be easily and accurately applied to regular shaped sine bars, sine plates, chucks, work pieces and many other bodies without having to provide any notches in the latter. Cost of construction is thereby reduced and high precision measuring and adjusting are facilitated.

In the drawings:

Figure 1 is a side elevation of a sine angle bar shown resting on a surface plate and having my improved sine angle rollers applied thereto, one end of the sine angle bar being shown sustained by a gauge block on the surface plate; Fig. 2 is a plan of the sine angle bar shown in Fig. 1; Fig. 3 is a side elevation of one of my improved sine angle rollers, and Fig. 4 is an end elevation of the sine angle roller shown in Fig. 3.

Referring to the drawing, A indicates a sine angle bar which is a polygonal sided body of rectangular shape throughout, the upper side 10 of said bar constituting the usual fiducial surface, that is the standard surface used for determining an angle. The lower side of said bar is parallel to the fiducial surface. Two cylindrical rollers B and C of equal diameter are applied to the body of the sine angle bar, one below each of the opposite ends. Each roller has a right dihedral ninety degree angle notch 11 in its side, said angle being formed by the precision plane surfaces 12 and 13 which are perpendicular to and intersect the axis of the roller and extend longitudinally the entire length of the roller. The cylindrical surface of each roller is ground to precision diameter. These rollers are applied by their closely fitting notches on the lower side 14 and against the opposite end surfaces 15 and 16 of the bar. In this position they are fastened to the bar by the screws 17 or other suitable means, said screws being countersunk in cross bores 18 within the rollers. The rollers are thus positioned on the extreme opposite ends of the sine angle bar in right dihedral angles which are formed by the precision plane surfaces 12 and 13 in each roller, while the axes of the rollers are parallel to each other, to the plane of the fiducial surface 10 and to the ends 15 and 16 of the bar. The bar may be of any width and thickness desired.

In use the sine angle bar is placed with the perimeter of its sine angle roller such as B at one end upon a suitable supporting surface such as D, which may represent the surface of a plate bed or other surface of any machine, tool or object. A gauge block E of selected height is next placed on the supporting surface D below the perimeter of the sine angle roller C at the opposite or upper end of said bar. In this manner the fiducial surface 10 may be made to assume any desired angle according to the height of the gauge block by which the surface of any work piece, tool or other body may be determined or made to assume.

It is contemplated within the spirit of my improvement to apply the sine angle bar when equipped with my improved sine angle rollers in pairs or in any multiple, in any well known manner in gauging or determining the angles of various surfaces. It is also contemplated to make my improved sine angle rollers of any length desired and to apply them for use to various objects among which are sine angle plates, angle plates, cubes, rectangular plates for use with sine angle plates, base plates for drill jigs and mill fixtures, vises, compound sine angle plates, sine parallels, magnetic chucks, etc., and to pivot various types of work at any desired angle for various uses. In this manner it will be noted that my improved sine angle rollers may be applied directly to chucks, vises and various tools for converting them into sine angle tools.

In the above various applications of my improvement, it is understood that a body is present in each instance which is equivalent to the body A described above, that said body has associated with it either directly or indirectly a plane fiducial surface, and that my improved sine angle rollers are applied to said body in the improved manner shown in the drawing and described above.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than those above set forth within the spirit thereof and within the scope of the following claims.

I claim:

1. In a sine angle device, a rectangular body having a fiducial plane surface and a pair of transverse ends, each end surface and the lower side of said body forming two positioning angle planes, two cylindrical sine angle rollers of equal diameter on the under side of said body, each of said rollers being notched longitudinally in its side, and each notch having right dihedral angle planes coinciding with said positioning planes at each end of said body, and means for fastening said rollers with the ends of said body secured in said notches.

2. In a device of the class set forth, a rectangular body having two opposite parallel side surfaces one of which constitutes a fiducial plane surface, and a pair of opposite parallel ends each disposed at ninety degrees to said fiducial surface, said ends and the other of said side surfaces forming positioning means, and a pair of sine angle cylindrical rollers, each of said rollers having a longitudinal notch in its side, said notch having two positioning planes forming dihedrals at right angles to each other, one of said rollers being engaged at each of said opposite ends of said body with said positioning planes of said body coinciding with the dihedral planes of one of said rollers.

ERNEST A. BERRY.

REFERENCES CITED

The following references are of record in the file of this patent:

UNITED STATES PATENTS

| Number | Name | Date |
|---|---|---|
| 1,312,546 | Karasick | Aug. 12, 1919 |
| 1,343,751 | Summons | June 15, 1920 |